Dec. 16, 1969                S. R. VANN                3,483,937
                        FOLDABLE MOTOR SCOOTER
Filed Feb. 21, 1968                              3 Sheets-Sheet 1

STEPHEN R. VANN
INVENTOR.

BY P. E. Geauque
ATTORNEY

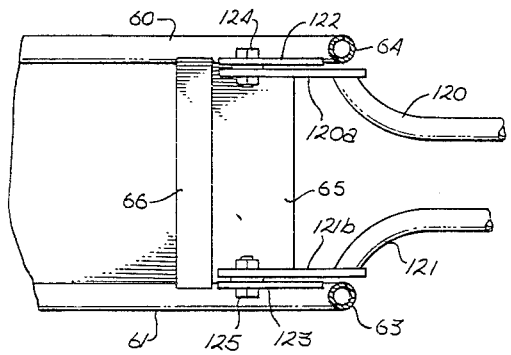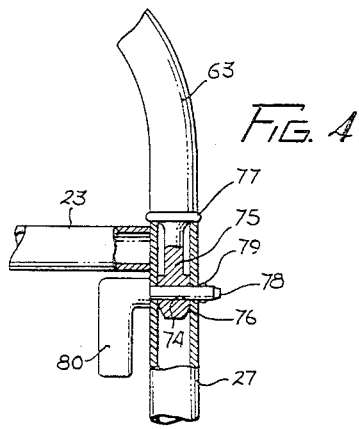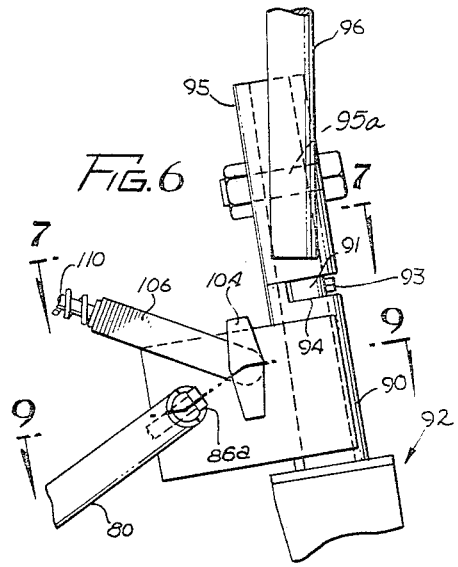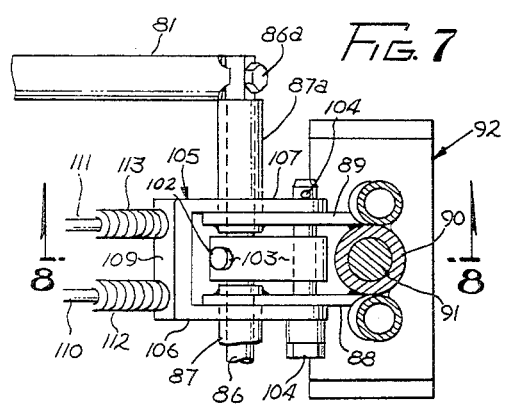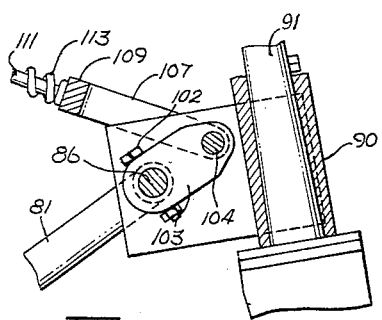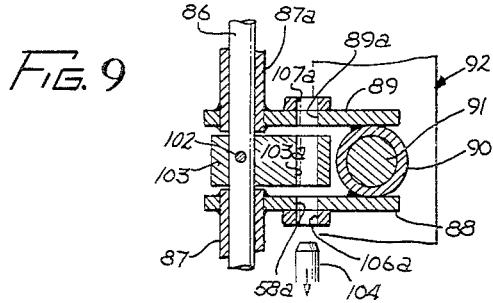

Dec. 16, 1969    S. R. VANN    3,483,937
FOLDABLE MOTOR SCOOTER
Filed Feb. 21, 1968    3 Sheets-Sheet 3
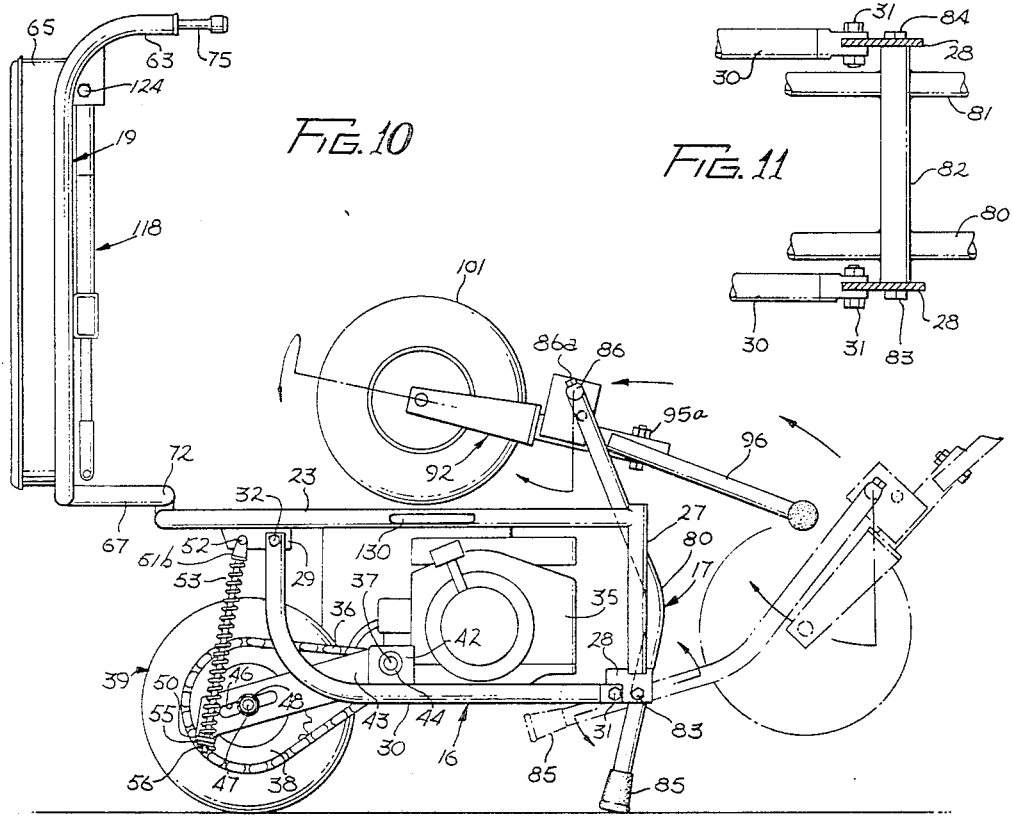
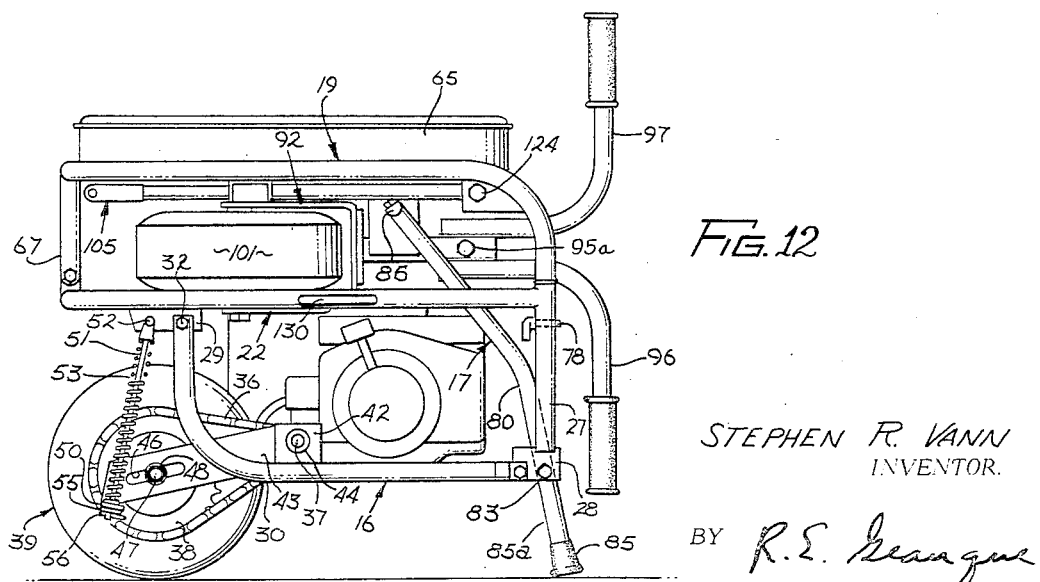
STEPHEN R. VANN
INVENTOR.
BY R. E. Geangue
ATTORNEY 3,483,937
FOLDABLE MOTOR SCOOTER
Stephen R. Vann, 20160 Vanowen St.,
Canoga Park, Calif. 91306
Filed Feb. 21, 1968, Ser. No. 707,077
Int. Cl. B62d 61/00
U.S. Cl. 180—32                         16 Claims

ABSTRACT OF THE DISCLOSURE

The scooter has a non-foldable central frame portion and a front wheel frame portion that is pivotally attached to the central frame portion at one end. The other end of the front wheel frame portion is pivotally attached to a front wheel assembly consisting of the front wheel and the front wheel fork. In normal operation, the front wheel assembly is locked to the front wheel frame portion. A seat portion is pivotally attached on top of the central frame portion and can be rotated upwardly to provide storage space for the front wheel assembly. A tie bar extends from the seat frame portion to the front wheel assembly in order to provide spring suspension for the front wheel assembly. The scooter is folded by rotating the front wheel frame portion upwardly and at the same time releasing the front wheel assembly for clockwise positioning above the central frame portion after the seat frame portion and tie bar have been raised. The front wheel is then rotated about its fork axis to lie on the top of the central frame portion and the seat portion is then lowered to its initial position and locked. Thereafter, the scooter can stand on the rear wheel supported by the central frame portion and on legs comprising the ends of the front wheel frame portion.

---

This invention relates to a foldable scooter and more particularly to a foldable motor scooter which can be folded into a compact package for transporting and storing without the necessity of permanently removing any of the structural parts from the scooter.

Motor scooters which are used in connection with outdoor activities, such as camping and fishing, are commonly transported to the location of use by some other vehicle, such as an automobile, truck or trailer, and the scooter is then assembled at the point of use for transportation in the area. This type of scooter is sometimes stored by the owner when not in use and it is desirable that the scooters of this type be placed in a condition to be easily transported and easily stored. Presently, scooters of this type require that parts be permanently detached to make a compact package and the parts must later be reassembled before using the scooter. Reducing the size of the scooter in this manner is susceptible to the loss of parts and requires constant attention as to whereabouts of the parts. It has been proposed to fabricate a scooter in which some parts can be telescoped into other parts in order to reduce the size of the scooter and make it a more compact package. However, telescoping requires special construction of the parts and the parts are difficult to manipulate.

The present invention provides a foldable scooter which can be folded into a very compact package for storage and transportation without the permanent removal of the parts from one another and only movable pins are utilized. The scooter has a rigid central frame which remains fixed in shape in both the operating and folded condition, and the rear drive wheel and engine are permanently attached to the central frame. The front wheel support frame extends forwardly from the central frame and is pivoted thereto for movement during folding of the scooter. A front wheel assembly is pivotally attached to the forward end of the front wheel frame so that the front wheel assembly can also move during packaging. A seat frame is located above the central frame and is pivoted thereto at one end and a pivotally attached tie bar extends from the seat frame to the front wheel assembly to provide a spring support for the front wheel.

When it is desired to fold the scooter, the tie bar is first detached from the front wheel frame and then the front wheel frame is pivoted at its attachment to the central frame and the front wheel assembly is pivoted relative to the front wheel frame. The tie bar is rotated under the seat as the seat is pivoted upwardly and the front wheel is twisted so that the wheel lies flat underneath the seat when the seat is returned to its normal position. The front wheel frame, when pivoted upwardly, has extending ends which project downwardly to provide support legs for the central frame so that the folded scooter can stand upright on the rear wheel and the support legs in the folded condition. The various movements are permitted simply by removal of locking pins which can then be replaced to avoid being misplaced. It is not necessary to detach any of the operating or structural parts of the scooter in order to fold and unfold the scooter and in the folded condition, the scooter has a substantially square outline to consume a minimum of space. If desired, the folded scooter could be hung on a wall bracket to save storage space. During folding, the seat is returned to its normal position, and provides an auxiliary seat when the folded scooter is standing.

It is therefore an object of the present invention to provide a foldable scooter which can be folded without removal of any of the operating or structural parts.

Another object of the invention is to provide a foldable scooter in which it is unnecessary to change the shape and construction of any of the parts to change from the unfolded to folded condition.

Another object of the invention is to provide a foldable scooter in which the engine and drive wheel are mounted on a fixed central frame and in which the front wheel is foldable upwardly and rotatable in order to be stored under the seat of the vehicle and above the central frame.

Another object of the invention is to provide a foldable scooter which is foldable into a configuration which is substantially square and in which the front wheel is moved upwardly and rotated for storage in a horizontal plane.

Another object of the invention is to provide a foldable scooter in which the scooter is folded by the pivotal and rotatable movement of the parts without changing the configuration of the individual parts.

Another object of the invention is to provide a foldable scooter in which the seat is movable upwardly relative to a central frame to provide a storage space for the front wheel, which is pivotally and rotatably moved underneath the seat.

These and other objects of the invention not specifically set forth above will become readily apparent from the accompanying description and drawings in which:

FIGURE 4 is an enlarged view, partly in section, of tion 4—4 of FIGURE 1 showing the releasable attachment of the seat frame to the central frame;

FIGURE 5 is a horizontal section along line 5—5 of FIGURE 1 showing the tie bar pivotally connected to the seat frame;

FIGURE 6 is an enlarged elevational view of location 6—6 of FIGURE 1 showing the front wheel assembly;

FIGURE 7 is a section along line 7—7 of FIGURE 6 illustrating the removable pin which disconnects the tie bar from the front wheel assembly and permits pivotal movement of the front wheel assembly;

FIGURE 8 is a vertical section along line 8—8 of FIGURE 7 illustrating the front wheel fork forming a portion of the front wheel assembly;

FIGURE 9 is a section along line 9—9 of FIGURE 6 showing the connecting pin for the tie bar in removed position;

FIGURE 10 is a side elevational view of the scooter in a partially folded condition with the front wheel assembly located above the central frame;

FIGURE 11 is a section along line 11—11 of FIGURE 1 showing the front wheel frame pivotally attached to the central frame; and FIGURE 12 is a side elevational view of the scooter in folded condition with the front wheel positioned horizontally underneath the seat of the scooter.

Figure 3:
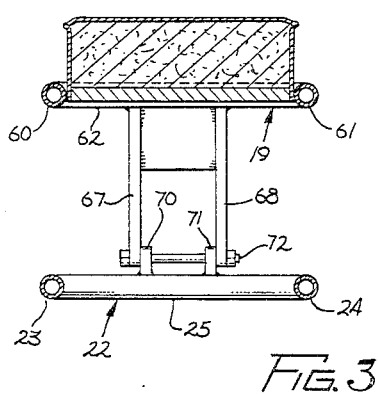
FIGURE 3 is a vertical section along line 3—3 of FIGURE 1 illustrating the pivotal attachment of the seat to the central frame.

Referring to the embodiment of the invention chosen for purposes of illustration, the scooter 15 has a fixed, non-foldable central frame 16, a foldable front wheel frame 17, a foldable tie bar 18, a pivotally mounted seat frame 19 and a foldable front wheel assembly 20. Central frame 16 has a top U-shaped section 22 (see FIGURE 3) which consists of legs 23 and 24 and a rear bottom portion 25. The forward ends of the legs 23 and 24 each connect with an upright leg 27 of frame 16 and each leg 27 carries a lower bracket plate 28 rigidly affixed thereto. A bracket 29 is rigidly attached to each leg 23, 24 at its lower side (see FIGURE 1). A curved portion 30 of frame 16 on each side is rigidly connected at one end by a bolt 32 to a bracket 29 and to a bracket 28 at the other end by bolt 31 (see FIGURE 11). U-shaped member 22, the two front legs 27 and the two curved portions 30 provide a rigid central frame 16 which does not change shape when the scooter is folded up.

A plate (not shown) extends between frame portion 30 to support engine 35 which drives an output chain 36 through any suitable gear reduction associated with shaft 37. Chain 36 meshes with gear 38 on drive wheel 39 in order to propel the scooter. Each frame portion 30 has a bracket 42 carrying sleeve 44 to which is pivoted an arm 43. Each arm 43 contains a slot 46 for receiving and supporting axle 47 for the rear wheel 39 and the axle is held in a fixed position at each end by a nut 48. Also, each arm 43 has an end bracket 50 which contains a hole for the end of a rod 51 to extend therethrough. Each rod 51 is pivotally connected by a pin 52 to one of the brackets 29 on the upper frame member 22 and each rod is surrounded by a spring 53. A washer 55 is placed around end 51a of each of the rods 51 and at the exterior of the washer, a cotter pin 56 extends through the end 51a of each rod so that it limits the downward position of the arm 43. The upper end of each spring bears against cap 51b on the upper end of the rod 51 and the lower end bears against bracket 50. Thus, the two rods 51, springs 53 and the two arms 43 provide a spring suspension for the rear wheel 39 to permit the wheel to move up and down relative to the frame section 16 as irregular surface is encountered. The wheel 39 can be located relative to the brackets 43 in order to maintain proper slack in drive chain 36.

The seat frame 19 consists of a U-shape frame member having legs 60 and 61 and a bottom section 62 and the forward ends of the legs are bent into downwardly extending legs 63 and 64, respectively, (see FIGURE 5). A pair of spaced straps 66 extend between the legs 60 and 61 in order to support a seat pad 65. A pair of arms 67 and 68 (see FIGURE 3) extend downwardly from the bottom portion 62 of the seat frame and have ends which overlap brackets 70 and 71, respectively, extending upwardly from the bottom 25 of the frame member 22. A bolt 72 passes through the arms and the brackets to pivotally connect seat frame 19 to central frame 16.

The ends of legs 63 and 64 of the seat frame, each terminate in a plug 75 (see FIGURE 4) extending into the open end of a leg 27 of central frame 16. Each plug 75 contains an opening 74 located opposite an opening 76 in leg 27 and each plug is positioned by a collar 77 so that each leg 63, 64 can be locked to the end of a leg 27 by a removable pin 78 having a locking detent 79 and handle 80. Thus, when the pins 78 are installed in the plugs 75, the seat frame 19 is held rigidly to the central frame 16. However, when the pins 78 are removed from the leg 27, the seat frame and seat can be pivoted upwardly about the pin 72 into the position illustrated in FIGURE 10.

The front wheel frame 17 consists of arms 80 and 81 which are connected together by bar 82 (see FIGURE 11) which is pivotally connected at its ends to the brackets 28 by means of pivot pins 83 and 84. As illustrated in FIGURE 10, the arms 80 and 81 extend beyond the pins 83, 84 and terminate in rubber pads 85 which engage the ground and provide support legs 85a for the scooter in its stowed condition (see FIGURE 12). The opposite ends of the arms 80 and 81 are secured by bolts 86a to a shaft 86 which extends through sleeve portions 87 and 87a which are attached to plates 88 and 89, respectively. These plates are attached to the outside of a collar 90 which receives post 91 for front wheel fork 92. The sleeve sections 87 and 87a provide means for the rotation of the front wheel fork 92 about the shaft for folding of the scooter.

The post 91 is held in the collar 90 by the lock bolt 93 attached to post 91 and located in cutout 94 of the collar to permit rotation of the post within the collar. Above the collar 90 is located a housing 95 which is held on the end of the post 91 by bolt 95a and has handle bars 96 and 97 secured thereto so that movement of the handle bars 96 and 97 secured thereto so that movement of the handle bars 96 and 97 will cause rotation of the post 91. The wheel fork 92 is connected to the lower end of post 91 and has sides 98 and 99 which support the axle 100 of the front wheel 101. Thus, movement of the handle bars 96 and 97 will rotate post 91 and front wheel 101 in order to guide the scooter.

A lug 103 is attached to shaft 86 by bolt 102. This lug extends towards the collar 90 and has an opening 103a therethrough in alignment with openings 88a and 89a in the side plates 88 and 89, respectively. When pin 104 is placed through the openings in plates 88 and 89 and in lug 103, the front wheel fork 92 and collar 90 are locked to the shaft 86 for movement therewith and since the shaft 86 is secured to the arms 80 and 81, the front wheel has a pivot point about the pins 83 and 84 which connect the front wheel frame 17 to the central frame 16.

Figure 2:
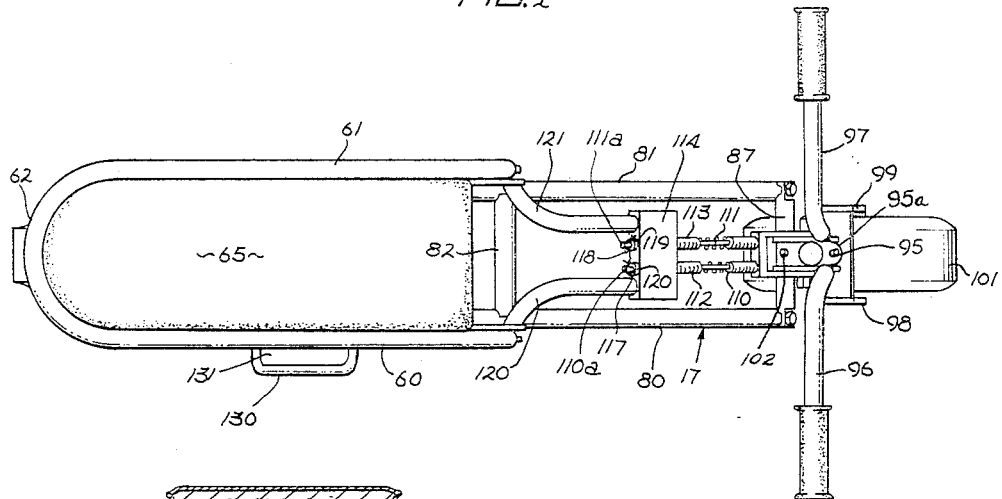
FIGURE 2 is a top plan view of the foldable scooter of FIGURE 1 showing the seat and the tie bar between the front wheel assembly and the seat frame.

A U-shaped member 105 of tie bar 18 has legs 106 and 107 which extend on opposite sides of plates 88 and 89 and have openings 106a and 107a, respectively, in their ends which can be aligned with openings 88a and 89a so that pin 104 can also be inserted through the arms 106 and 107 in order to connect the member 105 to the plates 88 and 89 and thereby to the front wheel fork 92 (see FIGURE 7). The pin 104 has a detent 104a to hold it when inserted. Two rods 110 and 111 are secured to crosspiece 109 of members 105 and extend through a block 114. The rods 110 and 111 are surrounded by springs 112 and 113, respectively, which extend between the piece 109 and the block 114. The ends 110a and 111a of the rod extending beyond block 114 carry cotter pins 117 and 118, respectively, located exteriorly of washers 119 and 120 (see FIGURE 2) so that the cotter keys serve as a stop for the separation of the block 114 from the member 105. Two arms 120 and 121 extend rearwardly from block 114 and have flat ends 120a and 121a which are pivotally connected by bolts 124 and 125 with brackets 122 and 123, respectively (see FIGURE 5)

which extend downwardly from the legs 60 and 61, respectively, of the seat frame 19. It is therefore apparent that the front wheel frame 17 and the tie bar 18 which are pivotally connected by pins 83, 84 and pins 124, 125, respectively, permit the front wheel 101 to move relative to the central frame and seat frame against the pressure of the springs 112 and 113 when uneven terrain is encountered, it being understood that the seat frame 19 is locked to the central frame 16 by the pins 78.

Figure 1:
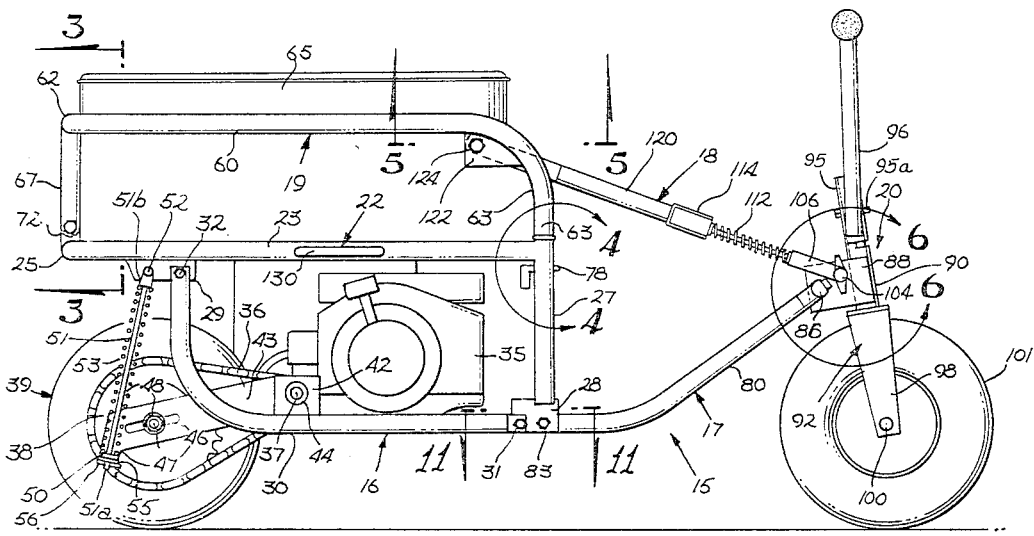
FIGURE 1 is a side elevational view of the scooter in the unfolded operating condition with the engine mounted on the central frame.

The unfolded condition of the foldable scooter is illustrated in FIGURE 1 in which condition the scooter is propelled by the engine 35 and the operator rides on the seat 65, guiding the scooter by the handle bars 96 and 97. Both the front and rear wheels have spring suspension to provide a soft ride for the operator. When it is desired to fold up the scooter for storage or transportation, the pins 78 are first removed in order to permit the seat and seat frame 19 to be moved upright into the position illustrated in FIGURE 10. In order to permit this upright movement, the pin 104 must first be removed to free the member 105.

As illustrated by the phantom line position of FIGURE 10, the front wheel frame 17 can now be rotated upwardly about the pins 83 and 84 and at the same time, the front wheel assembly 20 is free to rotate about the shaft 86 on sleeves 87 and 87a in order to move the front wheel between the arms 80 and 81 of the frame 17. The upward movement of the frame 17 and of the wheel assembly is continued until they reach the full line position of FIGURE 10, in which the front wheel 101 is located above the engine 35. Thereafter, the front wheel 101 is rotated by the handle bars 96, 97 until the wheel tire is supported by the legs 23 and 24 of the member 22 and the handle bars extend vertically.

Then, as illustrated in FIGURE 12, the seat 65 and seat frame 19 are returned to the initial position and the pins 78 are again installed in plugs 75 to hold the seat frame 19 rigidly to the central frame 16. As the seat frame is returned, the tie bar 18 is held against the seat frame so that in stored position, it is underneath the seat and rests on the front wheel. In the final folded position, the arms 80 and 81 of the front wheel frame slant rearwardly so that the pads 85 rest on the ground and the legs 85a form a support for the folded scooter at the opposite end from the rear wheel 39, so that the folded scooter will stand by itself and can serve as a stationary seat when not in use as a scooter. It is therefore apparent that the scooter can be folded up by simply pulling pins 78 and pin 104. The pin 104 releases the tie bar 18 from the front wheel assembly and the pins 78 releases the seat frame and tie bar for upward movement about pin 72. Also, the pin 104 releases the front wheel assembly 20 for counterclockwise rotation of the front wheel through the front wheel frame 17 as the front wheel frame is moved upwardly.

After the scooter has been folded, the pins 78 and pin 104 can be replaced and retained by the pin detents for storage so that there are no separated parts. Also, none of the structural parts, other than the pins, are completely separated from the scooter at any time. Further, none of the parts are changed in shape or construction in order to permit the folding and unfolding of the scooter. It is obvious that when it is desired to again unfold the scooter, the pins 78 are again removed to permit the seat to be rotated upwardly so that the handle bars can be rotated to raise the front wheel into a vertical position. The front wheel assembly is then rotated clockwise with the front wheel frame 17, at the same time rotating the front wheel 101 downwardly counterclockwise through the frame 17. After the wheel assembly has been returned to the position of FIGURE 1, the pins 78 and pin 104 can again be inserted through the parts in order to place the scooter in condition for travel. If desired, a rod 130 can be attached to the leg 60 of the seat frame 19 (see FIGURE 2) to provide a loop space 131 which can receive a wall bracket of any suitable construction so that the folded scooter can be hung on the wall of a garage or on any other support.

It is understood that various types of pivotal pins can be used between the various components and that the front wheel tie bar 18 could be eliminated if the front wheel frame 17 locked to and released by a pin from the frame 16. Also, various types of assemblies could be utilized to permit the front wheel to rotate and move bodily at the same time.

What is claimed is:

1. A foldable scooter comprising:
   a central frame portion;
   a front wheel frame portion extending from said central frame portion and pivotally connected at one end to said central portion;
   front wheel assembly means pivotally connected to the other end of said front wheel frame portion;
   means for holding said front wheel frame portion in extended position during movement of said scooter and for selectively releasing said front wheel frame portion for upward pivotal movement relative to said central frame portion; and
   means for rigidly attaching said front wheel assembly means to said wheel frame portion for movement of said scooter and for releasing said front wheel assembly means from said front wheel frame portion for pivotal movement upwardly in a counterclockwise direction to permit said front wheel assembly means to move into position over said central frame portion.

2. A foldable scooter as defined in claim 1 wherein said front wheel assembly means comprises:
   a front wheel fork and a front wheel; and
   a collar for rotatably mounting said front wheel fork for rotation of said front wheel into a horizontal plane in order to rest on said central frame portion after movement of said front wheel assembly means over said central frame portion.

3. A foldable scooter as defined in claim 1 having a seat frame portion pivotally connected at one end to said central frame portion and detachably connected at the other end to said central frame portion for permitting said seat frame portion to be pivoted upwardly before movement of said front wheel assembly means over said central frame portion.

4. A foldable scooter as defined in claim 3 having leg means on said seat frame portion for separating said seat frame portion from said central frame portion by a space large enough to receive said front wheel assembly means.

5. A foldable scooter as defined in claim 4 wherein said front wheel assembly means comprises:
   a front wheel fork and a front wheel; and
   a collar for rotatably mounting said fork for rotation of said front wheel into a horizontal plane in order to rest on said central frame portion after movement of said front wheel assembly means over said central frame portion.

6. A foldable scooter as defined in claim 3 having a tie bar means pivotally connected to said seat frame portion and to said front wheel assembly means when said scooter is operational, said tie bar means being releasable from said front wheel assembly means for upward movement with said seat frame portion, said tie bar means pivoting about said seat frame portion into position along said seat frame portion.

7. A foldable scooter as defined in claim 6 wherein said tie bar means comprises spring means for providing spring suspension of said front wheel assembly means.

8. A foldable scooter as defined in claim 1 wherein said front wheel frame portion comprises:
   a pair of arms each pivotally connected at one end to said central frame; and
   said wheel assembly means comprising a pair of plates pivotally mounted on a shaft connected to the other ends of said arms.

9. A foldable scooter as defined in claim 8 having a lug connected to said shaft and a pin extendable through aligned openings in said plates and in said lug for locking said front wheel assembly means to said front wheel frame portion.

10. A foldable scooter as defined in claim 8 wherein said arms of said front wheel frame portion are spaced apart by a sufficient amount to permit rotation of said front wheel assembly therebetween about said shaft in a clockwise direction.

11. A foldable scooter as defined in claim 10 wherein said front wheel assembly means comprises:
a collar attached to said plates;
a front wheel fork having a post rotatable in said collar and handle bars attached to said post; and
said front wheel fork after being placed above said central frame being rotated into horizontal storage position on top of said central frame by positioning said handle bars in a vertical plane.

12. A foldable scooter as defined in claim 1 wherein said front wheel frame portion extends beyond its pivotal connection with said central frame portion at its one end for providing legs for the scooter after being folded.

13. A foldable scooter as defined in claim 3 having pin means for detachably connecting said seat frame portion to said central frame portion, said pins being reinserted after releasing said seat means for storage while said scooter is in folded condition.

14. A foldable scooter as defined in claim 7 wherein said spring means comprises slidable rods surrounded by springs for permitting pivotal movement of said front wheel frame portion about its connection with said central frame.

15. A foldable scooter as defined in claim 1 having an engine mounted on said central frame portion and a rear wheel suspended from said central frame portion and driven by said engine.

16. A foldable scooter as defined in claim 15 wherein said central frame section comprises spaced vertical frame sections connected by horizontal crosspieces.

References Cited

UNITED STATES PATENTS

| | | | |
|---|---|---|---|
| 424,870 | 5/1890 | Fay | 280—275 |
| 2,910,130 | 10/1959 | Schlaphoff | 280—287 X |
| 3,042,132 | 7/1962 | Bouffort | 280—278 X |
| 3,096,997 | 7/1963 | Merry | 280—275 |
| 3,354,976 | 11/1967 | Camps | 180—32 |

KENNETH H. BETTS, Primary Examiner

U.S. Cl. X.R.

180—33; 280—278